April 23, 1940.  C. A. SCOGLAND ET AL  2,198,043
FISHHOOK MOUNTING
Original Filed June 28, 1937
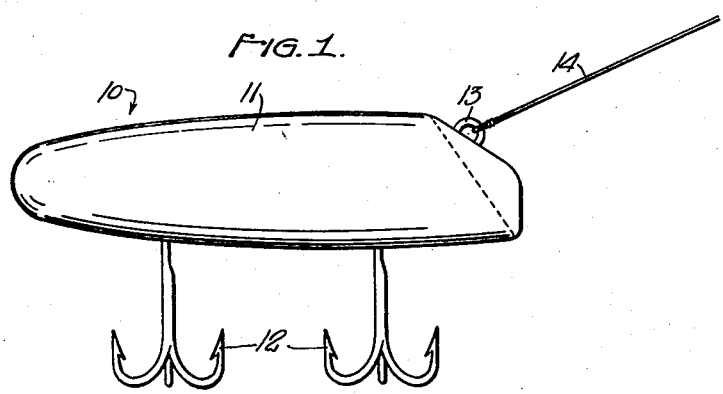
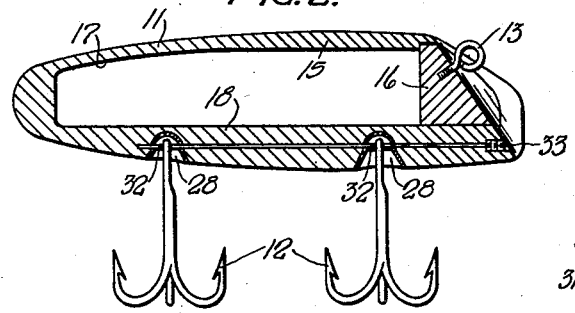
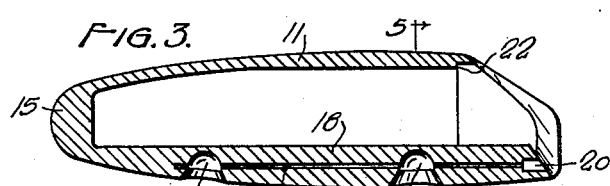
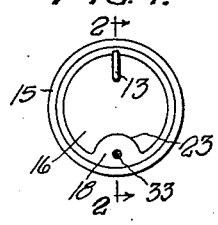
CHARLES A. SCOGLAND.
PHILIP H. SANDERS.
INVENTORS
BY *Oltsch & Knoblock*
ATTORNEYS.

Patented Apr. 23, 1940

2,198,043

UNITED STATES PATENT OFFICE

2,198,043

FISHHOOK MOUNTING

Charles A. Scogland and Philip H. Sanders, South Bend, Ind., assignors to South Bend Bait Company, South Bend, Ind., a corporation of Indiana Original application June 28, 1937, Serial No. 150,686. Divided and this application October 3, 1938, Serial No. 232,923

7 Claims. (Cl. 43—28)

This application is a division of our copending application, Serial No. 150,686, filed June 28, 1937.

This invention relates to improvements in fish hook mountings, and has for its primary object to provide novel means for mounting fish hooks on a hollow body.

A further object is to provide a hollow fish bait having a bore in its wall to removably mount an elongated member which is exposed at a hook receiving body recess intermediate its ends to mount a hook.

A further object is to provide a fish bait of molded material having a recess for the reception of the eye of a hook, and a member lining said recess and held to place by the means for pivoting said hook.

Other objects will be apparent from the description and the appended claims.

In the drawing:

Fig. 1 is a view of the fish bait in side elevation.

Fig. 2 is a longitudinal vertical sectional view of the fish bait taken on line 2—2 of Fig. 4.

Fig. 3 is a longitudinal vertical sectional view similar to Fig. 2 and illustrating the main portion of the bait body.

Fig. 4 is a view of the fish bait in front elevation.

Fig. 5 is a transverse sectional view taken on line 5—5 of Fig. 3.

Fig. 6 is a perspective view, with parts in section, illustrating the cup-shaped member lining the body recesses at the hook mounting thereof.

Referring to the drawing which illustrates one embodiment of my invention, the numeral 10 designates a fish bait having an elongated body 11 which carries hooks 12 and is provided with means 13 for attachment of a line 14.

The body 11 is of the "cigar" shaped type conventional in the art, and is preferably formed in two parts, a main portion 15 and a head 16. These parts are preferably formed of a suitable molded plastic material, such as a synthetic resin or the like. Main body portion 15 extends the full length of the bait and is open at one end to receive head 16 therein. The cavity 17 of body portion 15 is preferably of generally circular cross sectional shape interrupted by a thickened portion 18 of the wall of the bait body at the lower side thereof and extending the full length of said cavity. A longitudinally extending bore 19 of small diameter is formed in wall portion 18. The bore 19 communicates with an enlarged coaxial bore 20 at its forward end, said bore 20 opening at the front edge of the body. The rear end of bore 19 terminates forwardly of the rear end of the bait body. One or more recesses 21 are formed in wall portion 18, said recesses being closed at their inner ends and intersecting the bore 19 to communicate therewith, the rearmost recess preferably being forwardly spaced from the rear end of bore 19 and the foremost recess preferably being rearwardly spaced from bore 20. The recesses each preferably comprise an outer portion of frusto-conical shape and an inner substantially semi-spherical portion, the bore 19 preferably intersecting said recesses at a point substantially mid-way of the depth thereof. Cavity 17 of the body portion is preferably slightly enlarged at the forward end of said body portion to provide an annular shoulder 22 interrupted by portion 18.

Head 16 may be of any suitable construction, and fits closely with the front enlarged portion of cavity 17, with its rear edge seating against shoulder 22. The head is longitudinally recessed at 23 to fit closely on rib 18. Suitable cement is employed to secure the head 16 in operative position within the cavity of body portion 15. The head 16 and front edge of body 15 may be configured in any desired shape as by use of any suitable shaping means after the bait body has been assembled and cemented. The line attaching member 13 is preferably secured to head 16.

In each of the recesses 21 is fitted an inverted cup-shaped member 28 of a shape complementary thereto and preferably formed of metal; said member being here illustrated as shaped to comprise a central semi-spherical portion 29 and a frusto-conical skirt portion 30. Opposed holes 31 are formed in member 28 intermediate the height thereof to register with bore 19 when said member is seated in recess 21. A wire 32 slidably fits in bore 19 of the body and passes through openings 31 of member 28, and the eye of hook 12 is threaded on said wire when the parts are assembled. The wire thus serves to form a pivot mounting for the hook, the member 28 being of sufficient size to permit the hook eye to swing and pivot therein; and the wire also serves to secure the member 28 to place in fixed position in the body recess 21. A suitable self-tapping set screw 33 is tapped in bore 20 and thus locks wire 32 against displacement.

The hook mounting is simple and involves a minimum of parts. Also, assembly or connection of the hooks requires but a minimum amount of time. The construction accommodates rapid change or replacement of hooks, since it is only necessary to remove screw 33 and slide wire 32 out of bore 19 to disassemble the hook mounting arrangement. The screw 33 does not take any of the stress incident to playing and landing a fish, and, consequently, need only be sufficient to prevent longitudinal sliding of the wire in the bore. Likewise, the member 28 takes no stress, but serves only as a bearing or lining to prevent wear of the plastic body adjacent the recess incident to the movement and rubbing of the hook thereagainst.

We claim:

1. In combination, a hollow fish bait body having a thickened lower wall portion and a preformed longitudinal bore in the thickened wall thereof, said bore being open at one end, a preformed lateral recess in the thickened wall intersecting said bore in spaced relation to the inner ends of each, a hook having an eye seated in said recess, and an elongated securing member seated in said bore and extending through the eye of said hook.

2. In combination, a hollow fish bait body having a longitudinally extending thickened wall portion at the lower side thereof, a preformed longitudinal bore in said thickened portion open at one end, a preformed recess in said thickened wall portion intersecting said bore, a hook having an eye extending into said recess, and a member extending through said eye and removably locked in said bore.

3. In combination, a hollow fish bait body having a preformed longitudinal bore in the lower wall portion thereof, said bore being open at one end, an elongated member slidably mounted in said bore, a member secured in the end of said bore for retaining said elongated member, a recess in said wall portion intersecting said bore, and a hook extending loosely into said recess and pivoted on said elongated member.

4. In combination, a hollow molded fish bait body having a recess in the lower wall portion thereof and a longitudinal bore in said wall portion intersecting said recess, an elongated member locked in said bore, a cup-shaped metal member lining said recess, and a hook extending loosely into said lining member, said elongated member securing said lining in said recess and pivotally mounting said hook.

5. In combination, a hollow molded fish bait body including a thickened wall portion, intersecting openings in said wall, a metal lining fitting one opening, a hook extending loosely into said lining, and a member locked in the other opening extending through said lining to secure the same and pivot said hook.

6. In combination, a hollow plastic fish bait body including a thickened wall portion having a recess and a bore intersecting said recess, a metal lining member of a shape conforming to the contour of said recess and having opposed openings registering with said bore, and a locking member seated in said bore and extending through said lining openings.

7. In combination, a fish bait body having a recess and a bore intersecting said recess, a member fitting in said recess and having an opening therein, and a locking member in said bore passing through said opening.

CHARLES A. SCOGLAND.
PHILIP H. SANDERS.